Figure 1:
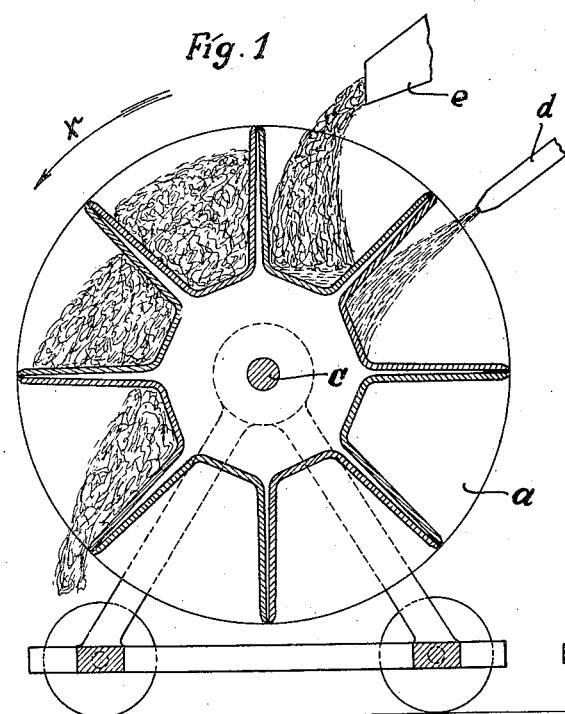

Feb. 2, 1932.   T. GILLER   1,843,716
APPARATUS FOR TRANSFORMING MOLTEN MATTER SUCH
AS SLAG INTO FROTHY POROUS MATTER
Filed July 3, 1928

Theodor Giller
by C. P. Goepel
his Attorney.

Patented Feb. 2, 1932

1,843,716

UNITED STATES PATENT OFFICE

THEODOR GILLER, OI MULHEIM-RUHR, GERMANY

APPARATUS FOR TRANSFORMING MOLTEN MATTER SUCH AS SLAG INTO FROTHY POROUS MATTER

Application filed July 3, 1928, Serial No. 290,201, and in Germany July 19, 1927.

My invention relates to improvements in the process of and apparatus for transforming molten matter such as slag into frothy porous matter, and more particularly in the process, in which the molten matter such as blast-furnace slag is broken up by means of a jet of water or compressed air. For manufacturing a frothy material, the blast-furnace slag is delivered into a receptacle containing hot water, the slag being swollen by the steam produced thereby. In another process the slag is passed into a gutter having water flowing therethrough, so that the slag is likewise swollen by the steam. The first-named process is objectionable for the reason that the porous material must be removed from the receptacle by means of suitable machinery, and the life of the said machinery is small because the scoops and other parts are subject to rapid wear, particularly by reason of small parts of metal such as iron occurring in the slag. In the process in which the slag is delivered into a gutter the porous material must be removed by the water flowing through the gutter, the said water being taken up in an irregular way by the porous slag. Thus the said water must be shipped together with the material, so that the cost of shipping is comparatively high. Further, both methods are objectionable because the result is a wet material, and a large amount of fine sand is produced which spoils the material when used for building purposes.

In another process the liquid slag is transformed into frothy material by blowing gas or steam under pressure into the same. This process is expensive by reason of the power required for compressing the air.

The object of the improvements is to provide a process of treating molten matter such as blast-furnace slag which results in a more valuable material. More particularly the process is carried out so that the amount of steam or water used for swelling the slag can be exactly regulated according to the amount of the slag, so that a better material is obtained which has the desired degree of humidity. Therefore kinds of slag can be subjected to the process which heretofore could not be used for making frothy slag. The progress of the process can be easily controlled, and the amount of fine sand produced in the process is reduced.

With the aforesaid objects in view my invention consists in distributing the molten slag into individual receptacles, and treating the same while in a molten state with water or by a current of air directed on the molten slag. For producing a frothy material, the slag is filled into the individual receptacles after supplying thereto a measured amount of water, the said water being vaporized by the hot slag and supplying the steam needed for transforming the slag into a valuable dry frothy slag. In the process the amount of water can be exactly adapted to the amount of the slag.

The current of slag can be distributed, for example by means of a rockable distributing gutter, on a plurality of individual stationary receptacles located one beside the other, or the current of slag is supplied from a stationary gutter to a series of travelling receptacles each receiving the desired amount of slag. Similar means may be provided for supplying the necessary amount of water to the receptacles. If it is desired to produce granular material, the water is supplied to the receptacles while or after filling the slag into the same.

For the purpose of explaining the invention several apparatus suitable for putting the same into effect have been shown in the accompanying drawings, in which the same letters of reference have been used in all the views to indicate corresponding parts. In said drawings, Fig. 1 is a sectional elevation showing a drum rotatably mounted on a horizontal axis and having receptacles arranged about its circumference, Fig. 2 is an elevation looking from the right in Fig. 1, Fig. 3 is a sectional elevation showing a modification in which the receptacles are combined in the manner of an endless chain, and Fig. 4 is an enlarged top plan view of one of the receptacles used in the apparatus shown in Fig. 3.

Figure 2:
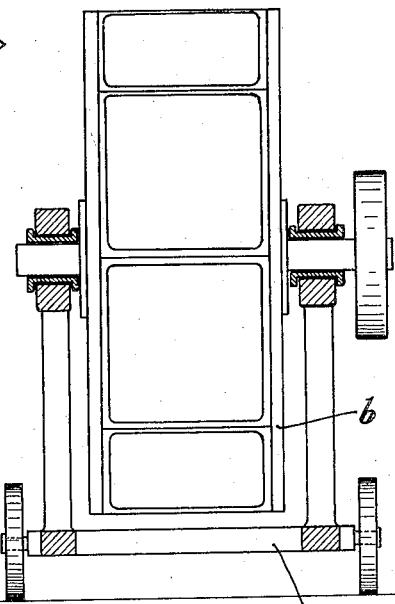

In the construction shown in Figs. 1 and 2 the apparatus comprises a drum $b$ rotatably mounted on a horizontal shaft $c$ and having segmental receptacles $a$ arranged around its circumference. While rotating the drum in the direction of the arrow $x$ water is supplied through a pipe $d$, and thereafter the slag is supplied through a gutter $e$, so that the slag falls on the water previously supplied to the receptacle. By vaporization of the water the slag is transformed into frothy form, whereupon it is discharged from the bottom part of the drum, as is indicated in Fig. 1.

Figure 3:
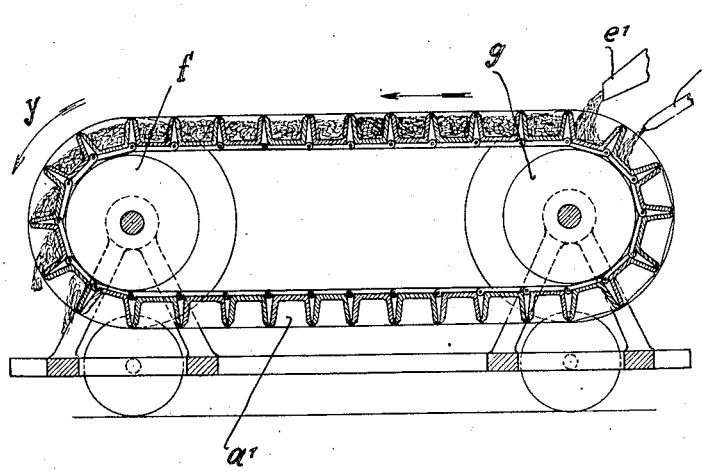
Figure 4:
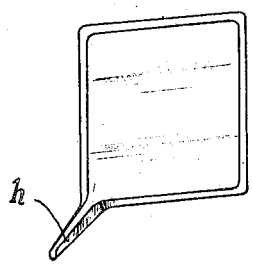

In the modification shown in Fig. 3 the receptacles $a^1$ are jointed to one another at their ends thus producing an endless chain, which chain is trained on two sprocket wheels $f$ and $g$ adapted to be rotated in the direction of the arrow $y$. Water and slag are successively supplied through a pipe $d^1$ and a gutter $e^1$. Thus the slag is treated in the same way as has been described with reference to Figs. 1 and 2, and the frothy slag is discharged at the left hand bottom part of the apparatus.

In order that the apparatus may be used for treating the slag from several blast furnaces I prefer to mount the same on a suitable truck such as $i$.

As appears from Fig. 4, the receptacles are provided at one side with an outlet $h$ through which any excess of water is discharged laterally of the apparatus, so that the said water is not discharged on the frothy material. I wish it to be understood that means for discharging the excess of water are provided in the example shown in Figs. 1 and 2 as well as in the example shown in Fig. 3.

In the figures I have shown a construction in which the water is supplied to the receptacles from the top side thereof. But I wish it to be understood that my invention is not limited to this feature, and that in some cases the water is supplied to the receptacles through pipes connected with the bottom or side wall of the receptacles.

Further, I wish it to be understood that the general arrangements of the apparatus shown in the figures are merely examples, and that the carriers of the receptacles may be constructed in a different way. For example, the receptacles may be placed on a horizontal disk mounted on a vertical rotary shaft. In this case the receptacles may consist of side walls movable on a fixed table providing the bottom of all the receptacles and having at one part an opening for delivering the frothy slag. If the receptacles are provided with integral bottoms they are mounted for being tilted laterally for discharging the finished material.

In the construction shown in Fig. 3 the endless chain is mounted so that the receptacles move in a horizontal plane. In some cases I prefer to dispose the wheels $f$ and $g$ at different levels, so that the chains are inclined. Further, the receptacles may be attached to a vertically disposed endless chain or chains.

In the figures only one circumferential series of receptacles has been shown. But I wish it to be understood that a plurality of circumferential series of receptacles may be provided on the same carrier.

I claim:

1. In an apparatus of the type for employing a treating fluid for transforming molten slag into frothy porous matter, embodying a supporting structure, an endless carrier mounted for rotation thereon and including a base, a series of retaining walls joined to the base and forming a series of successive separate open pockets having their openings at the side opposite the base, said pockets being constructed to contain the molten slag and treating fluid and adapted upon revolving movement of the carrier to pass through stages from an upright to an inverted position, means for separately introducing molten slag and treating fluid into the pockets through the openings thereof as the pockets move through upright position, the means for delivering the treating fluid into the pockets being so positioned that the treating fluid is admitted prior to the admission of the slag, said walls and openings freely permitting the escape of frothy porous matter as they move to and by their inverted position.

2. In apparatus of the type for employing a treating fluid for transforming molten slag into frothy porous matter, embodying a supporting structure, an endless carrier mounted for rotation thereon and including evenly spaced bottoms and retaining side and end walls projecting outwardly from the bottoms and forming pockets therewith, said bottoms being spaced apart and the end walls of adjacent pockets sloping toward one another from their respective bottoms, said pockets being open opposite their bottoms and adapted upon revolving movement of the carrier to be carried through stages from an upright to an inverted position, means for separately introducing molten slag and treating fluid into the pockets through the openings thereof as the pockets move through upright position, the means for delivering the treating fluid into the pockets being so positioned that the treating fluid is admitted prior to the admission of the slag, said sloping end walls and openings freely permitting the escape of the frothy porous matter as they move to and through inverted position.

3. Apparatus for the purpose set forth, embodying an endless base, rotary means supporting said base for rotation, a successive series of separate pockets carried by said base, and each formed by retaining walls projecting outwardly from said base, means established at a determinate point for delivering molten slag into said pockets, and separate means established at a determinate point for delivering treating fluid into said pockets to intermingle with the slag so as to transform the latter within the pockets into frothy porous matter during revolving movement of the pockets with the base, said treating fluid delivering means being so positoned that the treating fluid is admitted into the pockets prior to the admission therein of the slag.

4. Apparatus for the purpose set forth, embodying an endless rotary base, a successive series of separate pockets carried by said base, and each formed by retaining walls projecting outwardly from said base, said pockets upon revolving movement of the base passing through stages from upright position to inverted position, means for separately delivering molten slag and treating fluid into said pockets as the latter are carried through their upright position, the means for delivering the treating fluid into the pockets being so positioned that the treating fluid is admitted prior to the admission of the slag, and lateral channels projecting from the retaining walls and communicating with said pockets for discharging excess treating fluid introduced into said pockets prior to the time the pockets pass through their inverted position.

In testimony whereof I hereunto affix my signature.

THEODOR GILLER.